United States Patent [19]

Young

[11] 4,011,301

[45] Mar. 8, 1977

[54] AMMONIUM PHOSPHATE PRODUCTION AND THE REDUCTION OF FLUORINE AND SILICON EMISSIONS

[75] Inventor: Donald C. Young, Fullerton, Calif.

[73] Assignee: Union Oil Company of California, Brea, Calif.

[22] Filed: Oct. 23, 1975

[21] Appl. No.: 625,166

[52] U.S. Cl. .............................. 423/313; 423/310; 423/321 R; 423/341; 55/71; 71/43

[51] Int. Cl.² .................. C01B 15/16; C01B 25/26; B01D 19/00

[58] Field of Search .......................... 423/308–313, 423/470, 321 S, 321 R, 488, 471, 341; 71/43; 55/71

[56] References Cited

UNITED STATES PATENTS

| | | | |
|---|---|---|---|
| 3,151,941 | 10/1964 | Hollingsworth | 423/321 |
| 3,310,371 | 3/1967 | Lutz | 423/310 |
| 3,382,059 | 5/1968 | Getsinger | 423/310 X |
| 3,687,618 | 8/1972 | Clausen | 71/43 X |

*Primary Examiner*—Oscar R. Vertiz
*Assistant Examiner*—Gregory A. Heller
*Attorney, Agent, or Firm*—Richard C. Hartman; Dean Sandford; Michael H. Laird

[57] ABSTRACT

Ammonium phosphates are produced from wet-process phosphoric acids containing silicon and fluorine compounds by preconcentrating the acid and evolving some of the water, silicon and fluorine compounds as a vapor phase, maintaining it at a temperature above about 50° C., neutralizing the liquid acid concentrate with ammonia, and absorbing the isolated vapor phase from the evaporation zone in a relatively cool, neutralized ammonium phosphate solution at a pH of at least about 5.5.

9 Claims, 1 Drawing Figure

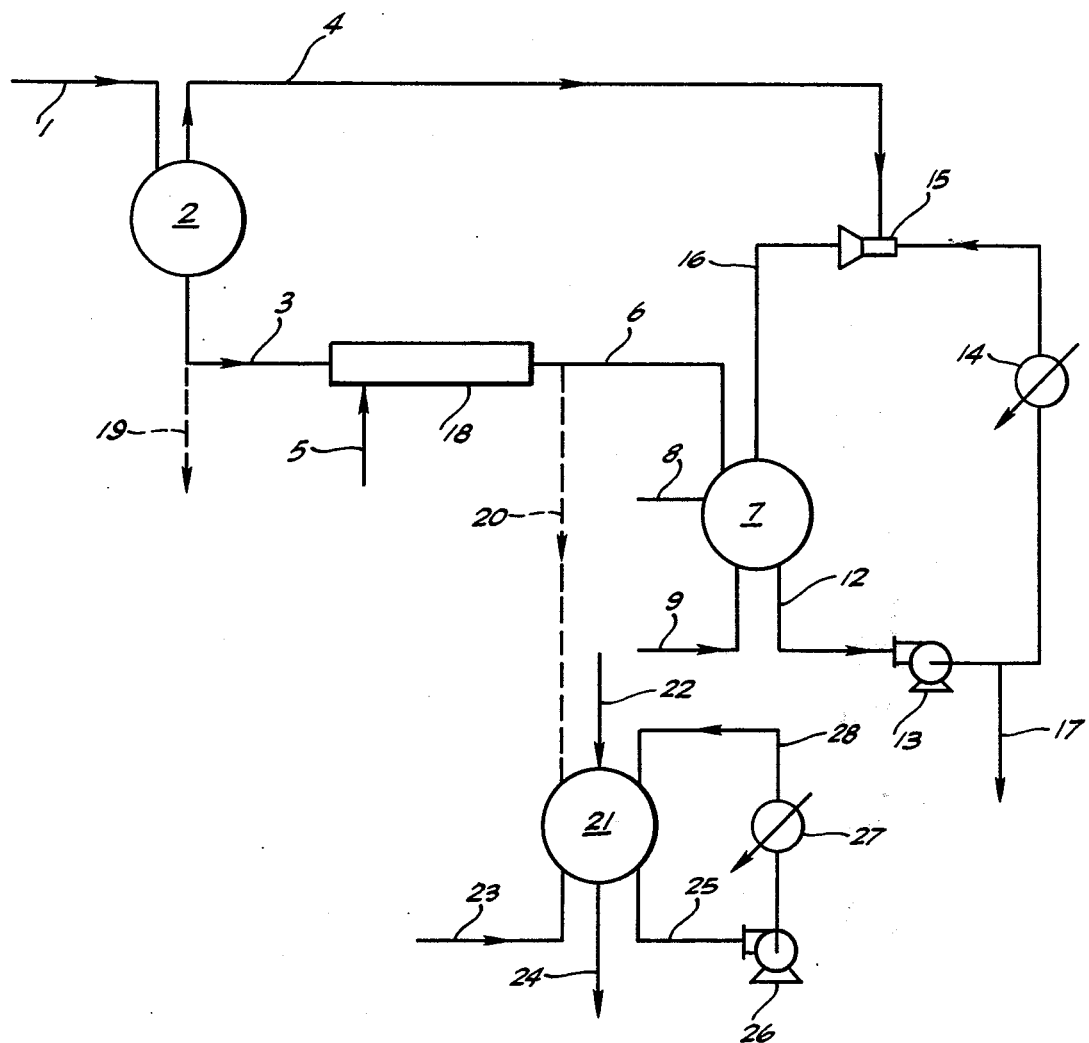

AMMONIUM PHOSPHATE PRODUCTION AND THE REDUCTION OF FLUORINE AND SILICON EMISSIONS

BACKGROUND OF THE INVENTION

Ammonium phosphate suitable for use as fertilizers can be obtained from wet-process phosphoric acids simply by neutralization with ammonia. It is often necessary, if not essential, however, to increase the $P_2O_5$ content, i.e., reduce the $H_2O/P_2O_5$ ratio, of the wet-process acid prior to neutralization. For instance, it may be desirable to produce an end product having a $P_2O_5$ content higher than that which can be obtained directly from available feeds.

Secondly, numerous processes have been devised to take advantage of the autogenous heat of neutralization of phosphoric acid with ammonia and achieve at least some polymerization to polyphosphates. This approach has several advantages. Firstly, wet-process acids contain substantial amounts of metallic and non-metallic impurities. These impurities promote precipitation or gelation upon neutralization with ammmonia unless the solution contains sufficient polyphosphates.

Polyphosphates are generally not found in wet-process acid feeds as obtained. They can be formed, however, by heating the raw or partially neutralized acid to relatively high temperatures, e.g., in excess of 260° C. At temperatures above about 260° C. sufficient water is driven from the solution to promote condensation of the phosphate groups into polymers, higher polymer or conversion levels being achieved at higher temperatures.

Substantial heat loads are required to accomplish this objective, and obviously more heat is required to drive off greater volumes of water. Thus, depending upon the $H_2O/P_2O_5$ molar ratio of the available acid feed, it may be impossible to reach polymerization temperatures by adiabatic neutralization alone. It thus becomes necessary to preconcentrate the acid and reduce the $H_2O/P_2O_5$ ratio to a level sufficient to obtain the required temperatures by neutralization. For that matter it is sometimes desirable to concentrate the feed acid to a point sufficient to form some polymeric phosphates with or without post neutralization.

In any event, evaporative preconcentration requires evolution in substantial water vapor. The expelled vapor carries with it some amounts of phosphoric acid, fluorine and silicon compounds. Fluorine and silicon are generally present in the vapor phase as hydrogen fluoride, silicon tetrafluoride and fluorosilicates.

These compounds, either alone or in combination with the phosphoric acid and/or water, significantly complicate vapor effluent recovery. For ecological and safety reasons, they can not be released to the atmosphere. Thus the prior art reports numerous attempts to solve this problem. For instance, U.S. Pat. No. 3,714,330 discusses the use of scrubbers and points out that such apparatus is very expensive due to the difficulty of recovering the aerosols or smokes produced by the vapor phase. Such apparatus is also subject to corrosion due to the acidic nature of the phosphoric acid, hydrofluroic acid and silicon tetrafluoride. Similarly, as pointed out in the U.S. Pat. No. 3,193,351, the recovery of these aerosols or smokes by scrubbing is very inefficient. This is obviously due largely to the physical and/or chemical nature of the aerosol formed in those processes.

These difficulties have led to several attempts to solve the problem of vapor phase recovery by other approaches. For instance, U.S. Pat. No. 3,764,657 suggests that the impurities which are apparently responsible for aerosol production can be removed with organic solvents such as the lower alcohols and ketones. However, this process requires the use of expensive solvents, preliminary scrubbing and separation steps, solvent recovery and purification. U.S. Pat. No. 3,800,029 suggests that at least some of the fluorine and silicon can be removed by precipitation as sodium fluorosilicate upon the addition of certain sodium compounds. This method also requires additional materials and process steps.

It is therefore one object of this invention to provide an improved method for concentrating wet-process phosphoric acid. It is another object to provide a method for producing ammonium phosphates including a wet-process acid preconcentration step with an improved, simplified method of recovering the vapor phase from the evaporator. Another object is the provision of an improved method for recovering the vapor phase generated by the evaporative preconcentration of wet-process acids containing silicon and fluorine compounds. Another object is the provision of an improved method of producing ammonium phosphate and purified wet-process phosphoric acids.

Therefore, in accordance with one embodiment of this invention, wet-process acids containing silicon and fluorine compounds are converted to ammonium phosphates by a method including evaporative preconcentration. The wet-process acid is heated to a temperature sufficient to vaporize a portion of the water which carries with it some of the silicon and fluorine compounds. The resultant vapor phase is recovered from the concentrated liquid, is preferably isolated from the atmosphere or other oxygen-containing gases, is maintained at a temperature above the dewpoint, e.g., at least about 50° C., and is absorbed directly into a dilute, neutralized and relatively cool ammonium phosphate solution having a pH of at least about 5.5.

The emphasis herein is on both the condition to which the vapor phase is exposed prior to absorption and the absorption conditions per se. While I am not certain of the identity and significance of all the variables involved, it appears that the physical and/or chemical nature of the vapor phase differs from that existing when these conditions are not met. Under these conditions the entire vapor phase, including all impurities, is readily absorbed by the procedures described. This is not the case when effluent vapors are cooled, e.g., by exposure to ambient air. The latter instance leads to aerosol formation and all the complications observed by previous investigators. Thus it must be that in this process the aerosols either do not form, or, if they do form, have chemical and/or physical properties which do not complicate, and which may even compliment absorption in relatively cool, neutralized, aqueous ammonium phosphate. To this end, however, the vapors must be kept hot and should not be contacted with ambient air.

In accordance with another embodiment, wet-process acids containing fluorine and silicon impurities are purified by a method including an evaporative preconcentration step from which water is evolved as a vapor phase carrying with it at least some of the silicon and fluorine impurities. The vapor phase is isolated and maintained at a relatively elevated temperature as described above. A portion of the preconcentrated acid or a raw acid from the same or different source is then converted to ammonium phosphate by neutralization with ammonia and the isolated, hot vapor phase is recovered by absorption in the neutralized ammonium phosphate solution. The remaining unneutralized acid from the preconcentrator is recovered as purified wet-process acid having a reduced concentration of silicon and fluorine compounds.

The several aspects of this invention will be more apparent from the drawing which is a schematic illustration of several embodiments. Wet-process acid feed is introduced via line 1 to evaporative preconcentrator 2 wherein it is heated to a temperature sufficient to evaporate the desired amount of water, thereby concentrating the acid.

Typical wet-process feeds are characterized by $H_2O/P_2O_5$ ratios of at least about 4.5, generally at least about 6, and often greater than 8. Of course there is generally no need for preconcentrating acids having very high initial $P_2O_5$ levels, i.e., low $H_2O/P_2O_5$ ratios. Thus the acids employed in this invention have $P_2O_5$ concentrations less than 65, generally at least about 20, usually between about 20 and about 60, and preferably between about 30 and about 65 weight percent (impurity free basis). Thus $H_2O/P_2O_5$ ratios are generally above 4.5, often above 5.5.

These acids also contain substantial amounts of metallic and non-metallic impurities including silicon dioxide, hydrofluoric acid, silicon tetrafluoride, fluorosilicic acid, sodium, magnesium and calcium, fluorosilicates and numerous other compounds of arsenic, magnesium, calcium, manganese, aluminum and iron, generally in the form of halides, sulfates or phosphates. The metallic impurities usually constitute 1 to about 20, generally about 2 to about 15 weight percent of the raw acid expressed as the corresponding metal oxides. Silicon concentrations is at least about 0.1, and generally between 1 and about 3 weight percent expressed as $SiO_2$ while fluorine concentrations range between about 0.1 and about 1 weight percent expressed as the element.

The temperatures employed in preconcentrator 2 should be at least about 120° C. and, for most purposes, will fall between about 120° and 350° C. The acid is retained in preconcentrator 2 at a temperature and for a time sufficient to drive off the desired amount of water, generally at least about 5 percent of the water present in the raw acid. The resulting vapor, comprising water, phosphoric acid, silicon (principally as silicon tetrafluoride) and fluorine (primarily as hydrogen fluoride) is recovered via line 4 and passed directly to product accumulator 7 via eductor 15 and line 16. Line 4 can be insulated or constructed of such materials as to assure that the vapor phase is maintained at a temperature of at least about 50° C., generally at least about 80° C. and preferably at least about 100° C., prior to contacting with the neutralized and cooled ammonium phosphate solution in accumulator 7 described hereinafter. This factor should also be kept in mind in the design and insulation of eductor 15 and line 16. Ordinary precautions will assure that the vapor phase is not contacted with any substantial amount of ambient air prior to absorption in accumulator 7.

Eductor 15 serves to create a vacuum on line 4 thereby assuring that no substantial positive pressure is created in evaporator 2. However, in most instances, sufficient positive pressure is created in preconcentrator 2 to insure adequate flow of the vapor phase to accumulator 11 without the need of an eductor or similar evacuating means.

Concentrated acid is recovered from preconcentrator 2 via line 3 and is passed to any suitable neutralization zone such as tubular reactor 18 wherein it is neutralized by ammonia introduced via line 5. A variety of batch and continuous, kettle and tubular reactors suitable for use in this process are known to the prior art. Illustrative tubular reactor systems are disclosed in U.S. Pat. Nos. 3,649,175 and 3,607,081 incorporated herein by reference. It should be understood, however, that the precise operation of neutralization zone 18 is not critical to this process beyond the extent that it should be sufficient to produce ammonium phosphate. Thus, batch reactors or other forms of continuous systems such as stirred tank reactors can be used.

The amount of ammonia injected into the zone 18 can vary substantially, as disclosed in the prior art, depending upon the desired results. For instance, if the objective of zone 18 is only the neutralization of the acid with ammonia to produce ammonium orthophosphate, the amount of ammonia introduced via line 15 can correspond to the stoichiometric amount required to convert all of the acid feed to the orthophosphate.

However, it is often desirable to take advantage of the autogenous heat of neutralization to polymerize or convert at least a portion of the acid to polymeric species. In that case the temperature in neutralizer 18 should be at least about 290° C. and preferably at least about 320° C. to assure substantial conversion. This objective can be accomplished without external heat provided that the autogenous heat of neutralization is sufficient.

The sufficiency or insufficiency of the heat of neutralization for this purpose is, in turn, determined by the water content or, conversely, the $P_2O_5$ content of the acid feed to neutralizer 18, i.e., $H_2O/P_2O_5$ molar ratio. As a practical matter, substantial conversion can not be obtained adiabatically with feeds containing less than about 50 weight percent $P_2O_5$, i.e., $H_2O/P_2O_5$ ratios above about 6 (assuming 10 weight percent cogeneric metallic impurities determined as acids). Thus, in this embodiment, it is preferred that the acid feed to zone 18 have a $P_2O_5$ content of at least about 50, preferably at least about 55 weight percent on an impurity free basis corresponding to $H_2O/P_2O_5$ ratios below about 6.5. However, higher ratio acids can be used if, as described in my copending application Ser. No. 605,016, incorporated herein by reference, the potential exothermic heat of neutralization is increased sufficiently, e.g., by adding to the feed a concentrated, strong mineral acid such as sulfuric, hydrochloric and/or nitric acids.

Under these circumstances the amount of ammonia added to zone 18 may or may not be that required to completely neutralize the acid. At the elevated temperatures required for polymerization, the acid phase will not take up the total amount of ammonia required for complete neutralization. Similarly, the addition of excess ammonia to zone 18 serves no substantial advantage. Consequently, high conversions are best obtained by adding about 40 to about 80 percent of the ammonia to neutralizer 18. The remainder is added to one or more of the lines or accumulators downstream of the neutralizer.

In any event, the neutralized or partially neutralized product is passed by line 6 to quench zone-accumulator 7 wherein it is cooled and diluted by water introduced via line 8 and further neutralized, if required, by ammonia or ammonium hydroxide introduced via line 9. Obviously all of the additional ammonia can be introduced with the dilution water. Total ammonia rate should be sufficient to obtain a final pH in accumulator 7 of at least about 5.5, preferably at least about 6 and generally between 6 and 8.5. The dilute, neutralized ammonium phosphate is then circulated via line 12, pump 13, cooler 14, eductor 15 and line 16. Ammonium phosphate product is removed from the recycle system via line 17.

Cooler 14 should be operated under conditions sufficient to reduce and maintain the temperature of the accumulated liquid phase below about 110° C., preferably below about 100° C. and generally below about 70° C. Under these conditions, stable ammonium phosphate solutions having $P_2O_5$ levels of about 45 weight percent or less, generally between about 15 to about 40 weight percent, can be maintained.

I have also discovered that under these conditions the vapor phase from preconcentrator 2 is readily adsorbed in the product in accumulator 7 by simply introducing the vapor into the accumulator vapor space. Obviously provision can also be made to assure more rapid liquid-vapor contacting between the product solution and vapor phase. Such systems might include baffle mixers, towers or other contacting apparatus. However, as illustrated in the examples discussed hereafter, that contacting apparatus of this nature is not required.

There is thus no net vapor effluent, much less any emission of noxious compounds. All of these are retained in a portion or all of the liquid product.

In an alternative embodiment, a portion, e.g., about 10 to about 95 percent of the preconcentrated, purified feed acid can be withdrawn from the above-described system via line 19 upstream of neutralizer 18. Similarly, a portion of the neutralized and cooled ammonium phosphate or polyphosphate from neutralizer 18, e.g., 10 to 95 percent, can be withdrawn via line 20 upstream of accumulator 7. About 10 to about 95 percent of the equivalent $P_2O_5$ content of the acid feed introduced via line 1 can be recovered at this point as purified ammonium phosphate.

This alternative is also illustrated in the drawing. Purified ammonium phosphate is recovered by passing it via line 20 to second accumulator 21 into which water and ammonia are introduced via lines 22 and 23, respectively. Water and ammonia injection rates are proportional to those used in accumulator 7 relative to the ammonium phosphate feed rate to each accumulator. As a general rule, ammonia and water rates to accumulator 21 are comparable to those described above in order to obtain products of the desired concentration and pH.

In a manner similar to accumulator 7, accumulator 21 is provided with a recycle loop primarily for mixing and product cooling to maintain liquid temperatures within the ranges described above, and to assure that the accumulator product will serve as an adequate quench medium for ammonium phosphate received from neutralizer 18. In accordance with the schematic recycle system, accumulated phosphate solution is passed via line 25 and pump 26 to cooler 27 and is then returned to the accumulator via line 28. Product is removed via line 24.

These alternatives are made possible by the fact that the vapor phase from preconcentrator 2 containing the silicon and fluorine impurities can be absorbed in a fraction, i.e., as little as 5 percent of the neutralized ammonium phosphate product. Similarly, the amount of material withdrawn either as concentrated and purified acid via line 19, or as purified ammonium phosphate via line 20 can be split between these two products as desired, provided however that the flow rate of quenched ammonium phosphate to accumulator 7 corresponds to at least about 5, and preferably at least about 10 percent of the total $P_2O_5$ introduced to preconcentrator 2. Thus, for example, the equivalent of 30 percent of the feed $P_2O_5$ content can be withdrawn via line 19 and an additional 40 percent via line 20.

These alternative embodiments, by providing for the production of dilute or concentrated phosphoric acids or ammonium phosphate solutions, serve to upgrade the product to an extent sufficient to allow its application in other uses. For instance the fluoride content of wet-process acid feed is generally too high to permit its direct use as an animal feed component. As a general rule the elemental phosphorus-fluoride weight ratio of animal feeds should be at least about 100. However, the fluoride content of most wet-process acids exceeds this level.

In this respect, product purity is determined by several variables. These include feed fluoride content, $H_2O/P_2O_5$ feed ratio and the amount of water removed in the evaporative preconcentrator. Obviously greater absolute and relative amounts of water can be removed from higher $H_2O/P_2O_5$ ratio feeds. Both of these factors facilitate fluoride evolution. Similarly, higher product purity can be obtained from feeds having lower initial fluoride levels. Several analytical techniques are available for determining fluoride content in both the feed and product. Accordingly, the artisan can readily determine whether or not a product of sufficient purity, i.e., sufficiently low fluoride content, can be obtained from a given wet-process acid, and the conditions required to accomplish that result. However, as a general rule, this objective can best be accomplished with acid feeds having $H_2O/P_2O_5$ molar ratios in excess of about 7, and reducing that ratio by a factor of at least 30 percent in the evaporative preconcentrator. The feed should also have an initial P/F elemental weight ratio above about 30, preferably above about 50.

EXAMPLE 1

This operation employed an apparatus similar to the illustrated in the drawing with the exception that withdrawal lines 19 and 20 were not utilized. The feed acid was a 52 weight percent $P_2O_5$ wet-process acid containing 11 weight percent metallic impurities determined as the corresponding oxides, 1.2 weight percent fluorides determined as elemental fluorine, and 2.0 weight percent silicon determined as $SiO_2$. The feed acid was passed to the preconcentrator at a rate of about 6 pounds per hour wherein it was heated to a temperature of 160° C. Sufficient water was removed in the preconcentrator to produce an acid concentrate having a $P_2O_5$ content of 60 percent.

This concentrate was then passed to a horizontally aligned, tubular reactor 1 foot long and 0.7 inches I.D. wherein it was contacted with 60 percent of the stoichiometric quantity of ammonia required for complete neutralization to 10-34-0 (0.22 pounds ammonia per pound $P_2O_5$). The acid concentration, ammonia injection rate and reactor design were sufficient to obtain a maximum reaction temperature of 370° C. These conditions were sufficient to maintain 70 percent conversion, i.e., production of a product in which approximately 70 percent of the $P_2O_5$ was present as polymeric species. The partially neutralized acid was then quenched to a temperature of about 38° C. in a circulating product solution (10-34-0). Sufficient water and ammonia (40 percent of the total stoichiometric amount added to the system) were added to the quench zone to maintain the target product composition of 10 weight percent nitrogen and 34 weight percent $P_2O_5$ having a pH of 6.4.

Water expelled from the raw feed was recovered from the vapor space of the preconcentrator, maintained at a temperature in excess of 100° C. and was passed directly into the vapor space overlying the liquid product in the accumulator. This procedure caused no substantial pressure buildup in the preconcentrator. All of the vapor phase was rapidly absorbed in the product accumulator. No vapors were emitted from the system.

EXAMPLE 2

The operation of Example 1 was repeated using a raw acid containing 30 weight percent $P_2O_5$. This material was concentrated in the evaporative preconcentrator at a temperature of 160° C. to produce a concentrate containing 60 weight percent $P_2O_5$. The concentrate was then passed to the tubular reactor described in Example 1 wherein it was contacted with 60 percent of the ammonia required for production of the target product 8-24-0 (0.24 pounds ammonia per pound $P_2O_5$). These conditions were sufficient to produce a maximum reaction temperature of 366° C. which maintained a conversion level of 75 percent. This material was passed to the product accumulator as described in Example 1 wherein it was contacted with the remaining 40 percent of the stoichiometric quantity of ammonia required for the production of 8-24-0 at pH 6.4; i.e., 0.16 pounds of ammonia per pound of $P_2O_5$.

As in Example 1, the vapor phase, comprising 45 percent of the water present in the raw acid feed (in addition to silicon and fluorine compounds) was maintained in a closed pipe at a temperature above 100° C., and was introduced directly to the vapor space overlying the 8-24-0 product in the accumulator. All of the vapors passed from the evaporative preconcentrator to the product accumulator were rapidly absorbed with the consequence that no vapors were emitted to the atmosphere.

EXAMPLE 3

A purified concentrated acid containing 60 weight percent $P_2O_5$ of reduced fluorine and silicon content can be obtained from the raw acid containing 52 weight percent $P_2O_5$ and cogeneric silicon and fluorine compounds described in Example 1 by withdrawing 60 percent of the purified, concentrated acid stream leaving the evaporative preconcentrator described in Example 1 and upstream of the tubular ammoniation reactor, i.e., at line 19 in the drawing. Ammonia flow rates at the ammoniation reactor and product quench-neutralizer, are identical to those described in Example 1 on the basis of pounds of nitrogen per pound $P_2O_5$. The same ammoniation reactor and accumulator facilities can be employed provided that the feed rate of raw acid to the evaporative preconcentrator is increased by a factor of 250 percent to provide the same acid flow rate to the ammoniation reactor after removing 60 percent of the total stream leaving the evaporative preconcentrator. The preconcentrator heat load is proportionately increased to maintain the design temperature of 160° C.

EXAMPLE 4

Purified ammonium phosphate having a reduced concentration of fluorine and silicon compounds can be obtained from the wet-process acid feed containing 52 weight percent $P_2O_5$ and fluorine and silicon compounds described in Example 1 by withdrawing 20 percent of the ammonium phosphate melt leaving the ammoniation reactor described in Example 1 prior to introduction of the melt into the product accumulator-quench zone, i.e., at line 20 in the drawing. The 20 percent slipstream is introduced into a separate quench zone 21 where it is contacted with sufficient water 22, ammonia 23 and recycled 10-34-0 product 28 to obtain the design 10-34-0 ammonium phosphate solution at a pH of 6.4 and quench the melt rapidly to a temperature of 38° C. Separate product recycle and withdrawal systems are provided for the slipstream product. The total vapor stream from the preconcentrator is introduced to the first product accumulator 7 described in Example 1. Thus, the slipstream product accumulator 21 remains free of the fluorine and silicon compounds contained in the vapor phase recovered from the preconcentrator and thus constitutes a purified ammonium phosphate product.

The ammoniation reactor can be of the same design described in Example 1 and can be operated with the same acid and ammonia flow rates. However, the absolute amounts of water and ammonia added to the first product accumulator 7 described in Example 1 are reduced by an amount proportionate to the reduction in the ammonium phosphate melt feed rate to that accumulator occasioned by the withdrawal of the 20 percent purified slipstream 20.

I claim:

1. The method of converting wet-process phosphoric acid containing silicon and fluorine as soluble compounds thereof to ammonium phosphates and reducing the emission of said compounds to the atmosphere, including the steps of (a) heating said wet-process acid feed to a temperature of at least about 120° C. sufficient to vaporize a portion of the water from said acid, concentrate said acid and form a vapor phase containing vaporized water and a portion of said silicon and fluorine; (b) separating said vapor phase from the concentrated acid, (c) maintaining said vapor phase at a temperature of at least about 50°° C. until said vapor phase is contacted with the ammonium phosphate solution hereinafter defined; (d) at least partially neutralizing at least 5 percent of said concentrated acid with ammonia to form said ammonium phosphates; and (e) contacting said vapor phase with said ammonium phosphates in the liquid phase at a liquid phase temperature below about 110° C., a vapor phase temperature of at least about 50° C., and a pH of at least 5.5, and absorbing said vapor phase in said ammonium phosphate solution.

2. The method of claim 1 wherein said wet-process acid feed contains at least about 20 weight percent $P_2O_5$, said feed is heated at a temperature of about 120° to about 350° C. for a period of time sufficient to drive off at least 5 percent of the water contained in said wet-process acid, said vapor phase removed from said liquid phase is maintained at a temperature of at least about 80° C. prior to contacting with said ammonium phosphate solution and is contacted with said solution at a solution temperature below about 100° C.

3. The method of claim 1 wherein said wet-process acid feed has a $P_2O_5$ content of about 20 to about 60 weight percent, a silicon content of at least about 0.1 weight percent determined as $SiO_2$, and a fluorine content of at least about 0.1 weight percent determined as the element, including the steps of heating said wet-process acid in step (a) to a temperature and for a period of time sufficient to reduce the $H_2O/P_2O_5$ molar ratio thereof at least to about 6.5, reacting the resultant acid with ammonia, and heating the same to a temperature of at least about 290° C. sufficient to convert at least 10 percent of the $P_2O_5$ content thereof to polyphosphates, diluting, quenching and neutralizing the resultant ammonium phosphates to a $P_2O_5$ content of less than about 40 weight percent, a temperature of less than about 100° C., and a pH of at least about 6, respectively, and contacting at least 5 percent of the solution thus formed with said vapor removed from said concentrating step under conditions sufficient to absorb said vapor in said solution.

4. The method of claim 1 including the steps of removing a portion of the heated and concentrated acid from the system after separation from said resultant vapor phase in step (b) and before said neutralization in step (d) and recovering said acid portion as concentrated, purified phosphoric acid having a higher elemental P/F weight ratio than said feed.

5. The method of claim 4 wherein said concentrated, purified acid is converted to ammonium phosphate by neutralization with ammonia.

6. The method of claim 1 including the steps of withdrawing from the system a portion of said neutralized acid from step (d) prior to said contacting with said vapor phase of step (e), isolating the thus withdrawn portion of partially neutralized acid from said vapor phase, and recovering said withdrawn portion as purified ammonium phosphate having a higher elemental P/F weight ratio than said feed.

7. The method of claim 6 including the steps of quenching said withdrawn portion of ammonium phosphate in an aqueous ammonium phosphate solution at a temperature below about 110° C. and at a pH of at least about 5.5.

8. The method of claim 3 including the steps of withdrawing from said system a portion of said polyphosphates prior to said contacting of said solution with said vapor, isolating said withdrawn polyphosphates from said vapors, and recovering said portion of said polyphosphates as purified ammonium polyphosphates having a higher P/F elemental weight ratios than said feed.

9. The method of claim 1 wherein said wet-process acid feed contains at least about 20 and less than about 65 weight percent $P_2O_5$, has an $H_2O/P_2O_5$ molar ratio of at least about 4.5, and contains about 1 to about 20 weight percent total cogeneric impurities and at least about 0.1 weight percent silicon expressed as $SiO_2$ and at least about 0.1 weight percent fluorine expressed as the element, and all of said vapor phase recovered from said concentrated acid is absorbed in said ammonium phosphate solution in the absence of any net vapor effluent from said absorption.

* * * * *